US007391751B2

(12) United States Patent
Lee et al.

(10) Patent No.: US 7,391,751 B2
(45) Date of Patent: Jun. 24, 2008

(54) CELLULAR COMMUNICATION METHOD BASED ON ENHANCED HYBRID DUPLEXING TECHNOLOGY

(75) Inventors: Yeon-Woo Lee, Seongnam-si (KR); Seung-Young Park, Seoul (KR); Sang-Boh Yun, Seongnam-si (KR); Won-Hyoung Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 62 days.

(21) Appl. No.: 11/247,786

(22) Filed: Oct. 11, 2005

(65) Prior Publication Data

US 2006/0077931 A1    Apr. 13, 2006

(30) Foreign Application Priority Data

Oct. 11, 2004    (KR)    ............ 10-2004-0080908

(51) Int. Cl.
*H04Q 7/00*    (2006.01)
(52) U.S. Cl. ........................... 370/330; 455/446
(58) Field of Classification Search ............ 370/329, 370/330; 455/446, 447, 449, 450, 451, 452.1
See application file for complete search history.

(56) References Cited

U.S. PATENT DOCUMENTS 5,551,060 A * 8/1996 Fujii et al. ............ 455/447

FOREIGN PATENT DOCUMENTS

| EP | 1 168 878 A2 | 1/2002 |
| EP | 1 259 092 A2 | 11/2002 |
| EP | 1 443 794 A2 | 8/2004 |
| WO | WO 99/39532 | 8/1999 |

OTHER PUBLICATIONS

Omiyi et al.: "Maximizing Spectral Efficiency in 3G with Hybrid Ad-Hoc UTRA TDD/UTRA FDD Cellular Mobile Communications", Spread Spectrum Techniques and Applications, Aug. 30, 2004.

* cited by examiner

*Primary Examiner*—Lee Nguyen
(74) *Attorney, Agent, or Firm*—The Farrell Law Firm, PC (57) ABSTRACT

An enhanced hybrid duplexing technology (EDHT)-based communication method including dividing a cell prescribed by a transmission power of the base station into at least two logical areas, dividing the system frequency band into at least two subbands, and communicating in different duplexing modes using at least one of the subbands according to a position of the terminal within the cell. According to the method, a flexible resource management is possible according to the communication environment by dividing an entire system band into at least two subbands, differentiating the bandwidths of the subbands and the duplexing techniques, and selecting and allocating the resources of the subbands according to the position of the terminal within the cell.

22 Claims, 6 Drawing Sheets

CELLULAR COMMUNICATION METHOD BASED ON ENHANCED HYBRID DUPLEXING TECHNOLOGY

PRIORITY

This application claims priority under 35 U.S.C. § 119 to an application entitled "Cellular Communication Method Based on Enhanced Hybrid Duplexing Technology" filed in the Korean Industrial Property Office on Oct. 11, 2004 and assigned Serial No. 2004-80908, the contents of which are hereby incorporated by reference.

BACKGROUND OF THE INVENTION

1. Field of the Invention

The present invention relates generally to a wireless communication system, and more particularly to a communication method for improving the flexibility of resource allocation and maximizing the system performance through an enhanced hybrid duplexing technology (EHDT) that selectively applies diverse duplexing modes.

2. Description of the Related Art

The next-generation wireless communication system, including the 3rd generation mobile communications, attempts simultaneous support of multimedia services of diverse traffic characteristics such as broadcastings and real-time video conferences in addition to voice services. Accordingly, in order to efficiently provide services of such diverse characteristics, a duplexing technique in consideration of asymmetry and continuity of uplink/downlink according to the service characteristics is required.

Generally, the duplexing technique is classified into a time division duplexing (TDD) and a frequency division duplexing (FDD). TDD is a technique for implementing bidirectional communication by dividing the same frequency band into time slots and alternately switching transmission and reception slots. An FDD is a technique for implementing bidirectional communication by dividing a given frequency band into transmission and reception bands.

In a TDD-based communication system, a base station can allocate a part or all of usable time slots to a terminal, and through this variable allocation of the time slots, asymmetric communication is possible. However, in TDD, if the radius of a cell is extended, a protection section between the transmission/reception time slots is increased due to a round trip delay and this causes the transmission efficiency to be lowered. Accordingly, it is improper to use TDD in a communication environment in which the cell has a large radius such as a macro cell.

Additionally, in TDD, the asymmetric ratios of the respective cells are not equal to each other in a multi-cell environment, and thus severe frequency interference occurs between terminals located on the border of an adjacent cell.

In an FDD-based communication system, the frequency bands for transmission and reception are separated from each other, and thus no time delay for the transmission or reception occurs. Accordingly, no round trip delay due to the time delay occurs. Therefore, FDD is suitable to the cell environment in which the cell has a large radius such as the macro cell.

However, in FDD, the transmission frequency band and the reception frequency band are fixed, which it is not proper for duplexing the asymmetric transmission.

Therefore, research into duplexing techniques that mix the two kinds of duplexing techniques in consideration of the diverse next-generation communication environments and traffic characteristics is being actively progressed.

Figure 1:
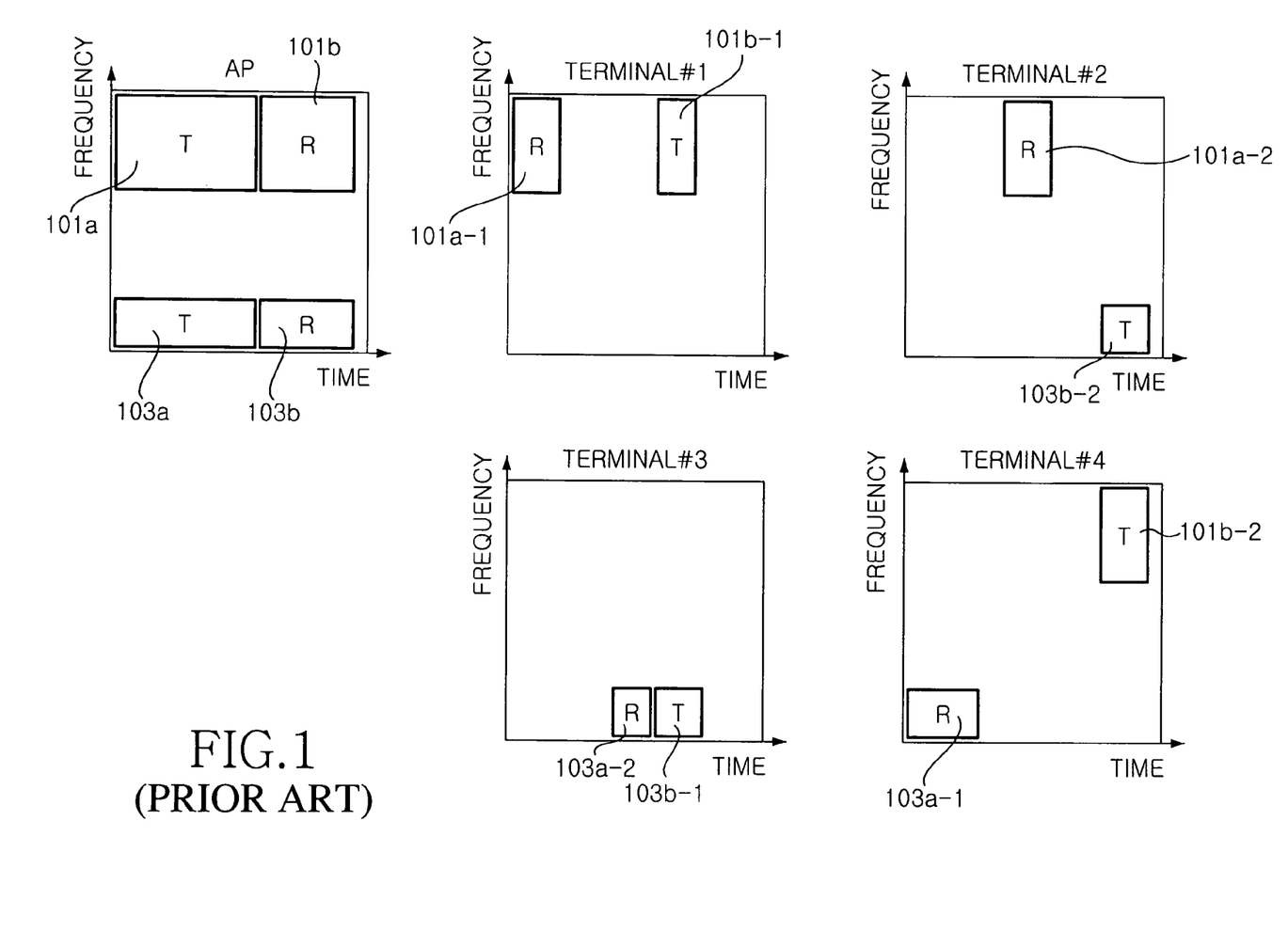
FIG. 1 illustrates a conventional duplexing technique based on a dual band.

FIG. 1 illustrates a conventional duplexing technique based on a dual band. Referring to FIG. 1, a base station performs the same-period transmission/reception mode conversion with respect to two frequency band channels, i.e., wide-band and narrow-band channels, and terminals connected to the base station operate in a reverse mode to the base station and are allocated with resources for reception and transmission on the two frequency band channels without any overlap. That is, with respect to the wide-band channel 101a of the transmission mode section of the base station, terminal #1 and terminal #2 each occupy half of the wide-band channel 101a as their reception mode sections, and terminal #3 and terminal #4 are allocated with parts of the narrow-band channel 103A of the base station transmission mode section as their reception mode sections 103A-2 and 103A-1, respectively. Additionally, with respect to the wide-band channel 101b of the reception mode section of the base station, terminal #1 and terminal #4 occupy parts of the wide-band channel 101b as their transmission mode sections 101b-1 and 101b-2, and terminal #2 and terminal #3 occupy parts of the narrow-band channel 103B of the base station reception mode section as their transmission mode sections 103B-2 and 103B-1, respectively.

Although the duplexing technique based on the dual band as described above enables flexible resource allocation possible by combining and allocating the wide-band channel and the narrow-band channel, it is difficult to expect the link continuity inherent in FDD because the transmission/reception mode conversions of the wide-band channel and the narrow-band channel are simultaneously performed.

Figure 2:
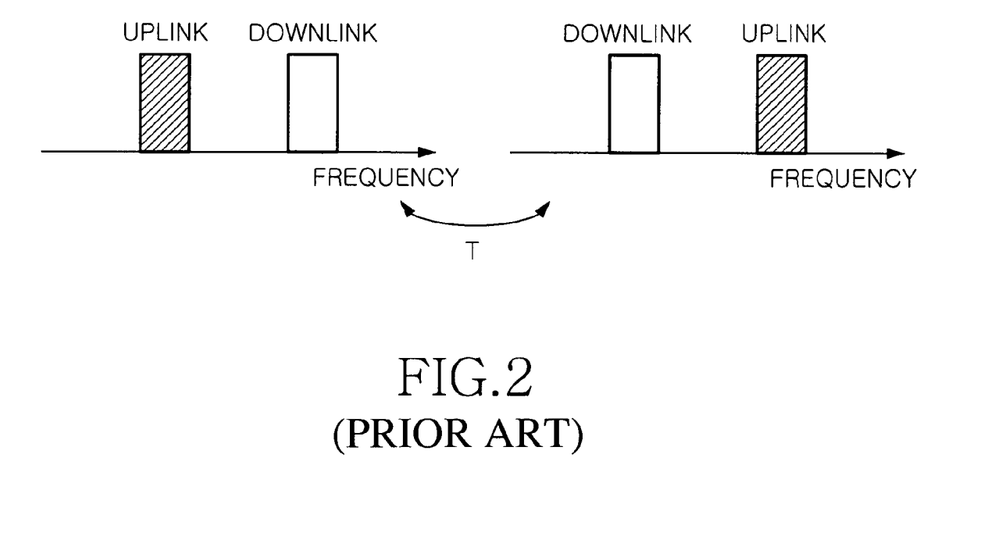
FIG. 2 illustrates a duplexing technique based on a band switching.

FIG. 2 illustrates a duplexing technique based on band switching. According to this duplexing technique based on a band switching, an uplink and a downlink are periodically repeated for a specified period (Tsec) within one band, and thus the other band is simultaneously used as the uplink and downlink with the channel conversion characteristic of TDD. However, when duplexing based on the band switching, because the same band channels are used, the flexibility of resource allocation is lowered and it is difficult to implement an asymmetric transmission by the periodic channel conversion.

SUMMARY OF THE INVENTION

Accordingly, the present invention has been designed to solve the above and other problems occurring in the prior art. An object of the present invention is to provide a communication method that performs flexible resource allocation by dividing a given system frequency resource into at least two channels having different bandwidths and to which different duplexing techniques are applied, and combining and allocating uplink and downlink resources of the channels according to the position of a terminal within a cell.

Another object of the present invention is to provide a communication method that improves system performance by allocating uplink and downlink resources to the most efficient mode according to a position of a terminal within a cell.

In order to accomplish the above and other objects, there is provided a communication method in a cellular communication system including at least one base station that communicates with a plurality of terminals through a given system frequency band. The method includes the steps of: dividing a cell prescribed by a transmission power of the base station into at least two logical areas; dividing the system frequency band into at least two subbands; and communicating in different duplexing modes using at least one of the subbands according to a position of the terminal within the cell.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. In the following description of the present invention, a detailed description of known functions and configurations incorporated herein will be omitted when it may obscure the subject matter of the present invention.

Figure 3A:
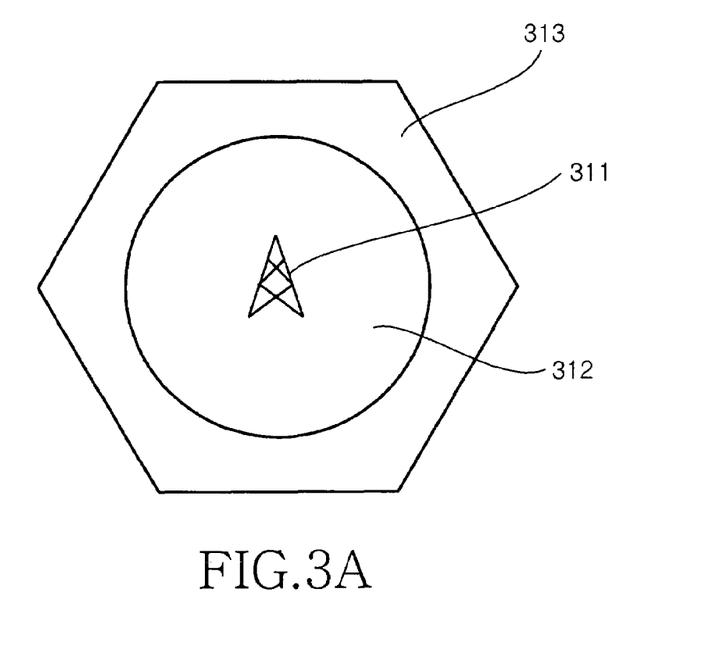
FIG. 3A is a schematic view illustrating a hybrid duplexing technology (HDT)-based cellular system according to the present invention.
Figure 3B:
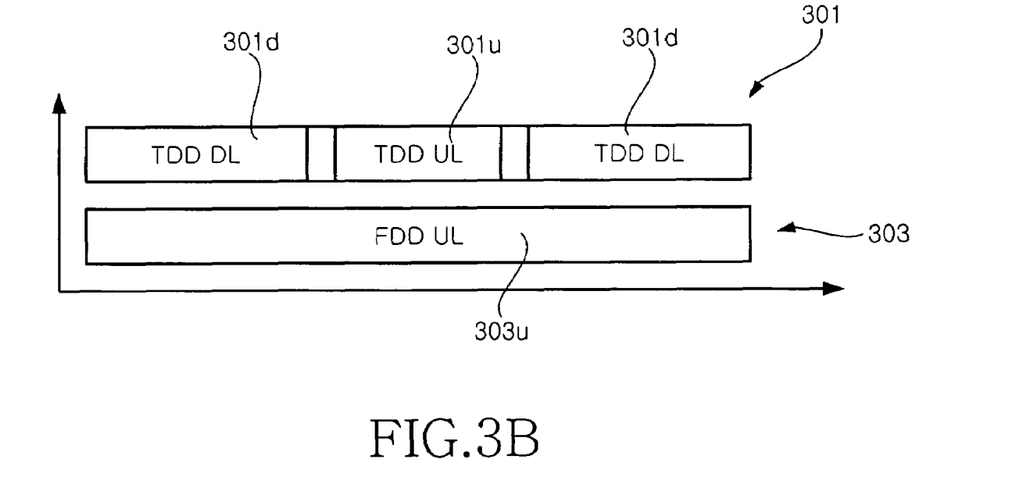
FIG. 3B illustrates a resource allocation technique of an HDT cellular system according to the present invention.

FIG. 3A is a schematic view illustrating a hybrid duplexing technology (HDT)-based cellular system according to the present invention, and FIG. 3B illustrates a resource allocation technique of an HDT cellular system according to the present invention. Referring to FIG. 3B, the hybrid duplexing technology (HDT) divides a given system frequency band into two channels 301 and 303. The first channel 301 is used as TDD uplink 301$u$ and TDD downlink 301$d$ by applying the TDD technique, and the second channel 303 is used as an FDD uplink 303$u$ only. The second channel 303 is combined with the downlink 301$d$ of the first channel 301 for duplexing.

Referring to FIG. 3A, a cell around a base station 311 of the HDT system is divided into an inner area 312 and an outer area 313. Resources of the TDD downlink and uplink 301$d$ and 301$u$ are allocated to a terminal located in the inner area 312, and resources of the TDD downlink 301$d$ and the FDD uplink 303$u$ are allocated to a terminal located in the outer area 313.

In the present invention, for flexible resource allocation in a wireless communication environment, which is becoming more complicated, an enhanced HDT (EHDT) technology is provided.

Figure 4:
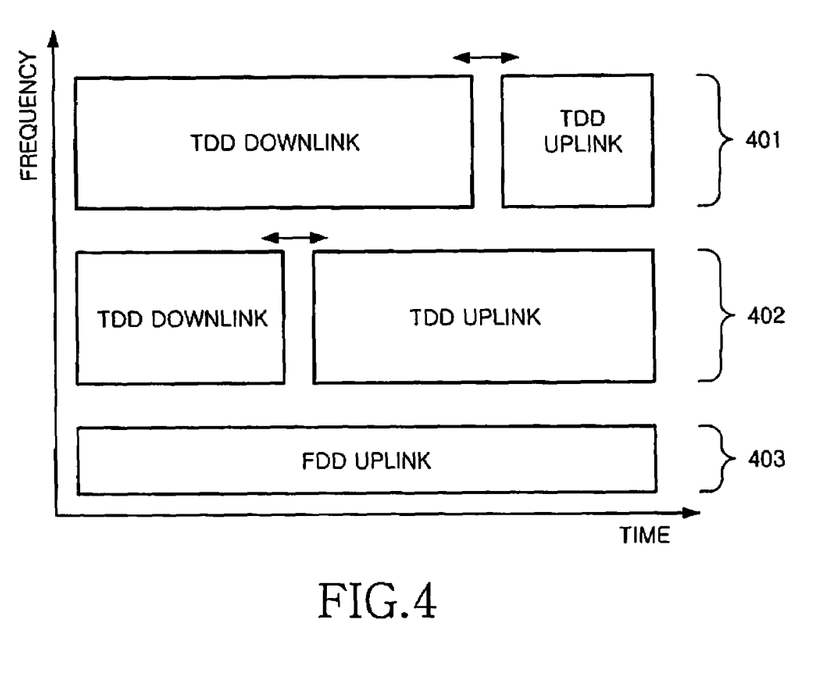
FIG. 4 is an exemplary view illustrating the channel of an enhanced HDT (EHDT)-based cellular system according to the present invention.

FIG. 4 is an exemplary view illustrating channel construction of an enhanced HDT (EHDT)-based cellular system according to the present invention. In the present invention, the entire system frequency resource is divided into three frequency bands, and the frequency bands are used as channels having different duplexing characteristics.

In FIG. 4, the given frequency resource is divided into two wide-band TDD channels 401 and 402 that provide uplink and downlink service and one narrow-band FDD channel 403 that provides an uplink service only. In addition, the frequency resource may be divided into one wide-band channel and two narrow-band channels, or may be divided into one wide-band channel and two multi narrow-band channels.

The EHDT system according to an embodiment of the present invention divides a given system frequency resource into one wide-band channel and two narrow-band channels.

Figure 5:
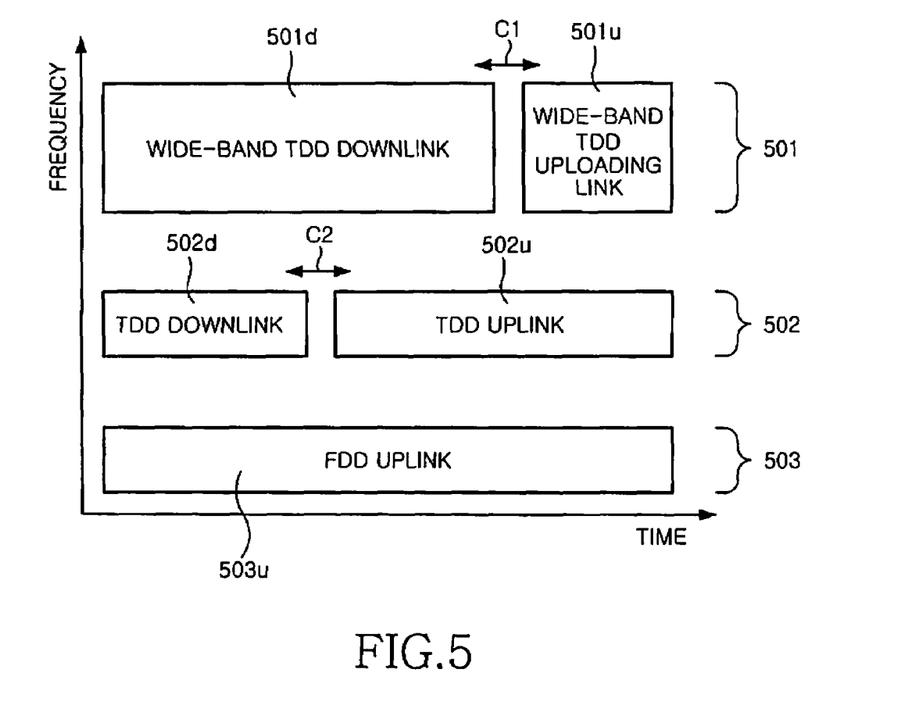
FIG. 5 illustrates the channel construction of EHDT system according to a preferred embodiment of the present invention.

FIG. 5 illustrates channel construction of EHDT system according to a preferred embodiment of the present invention. Referring to FIG. 5, the entire system band is divided into one wide-band channel 501 and two narrow-band channels 502 and 503. The wide-band channel 501 and the first narrow-band channel 502 are TDD-based channels, and provide uplink resources 501$u$ and 502$u$ and downlink resources 501$d$ and 502$d$. The second narrow-band channel 503 provides a downlink resource 503$d$ only.

Generally, a wide-band TDD mode that uses the wide-band TDD downlink 501$d$ and the wide-band TDD uplink 501$u$ and a narrow-band TDD mode that uses the narrow-band TDD downlink 502$d$ and the narrow-band TDD uplink 503$u$ may be considered.

Additionally, a discontinuous wide/narrow-band FDD mode that combines the wide-band TDD downlink 501$d$ and the narrow-band TDD uplink 502$u$ and a discontinuous narrow/wide-band FDD mode that combines the narrow-band TDD downlink 502$d$ and the wide-band TDD uplink 501$u$ are also possible.

In a preferred embodiment of the present invention, time points of uplink/downlink mode conversion of the TDD-based wide-band channel 501 and the TDD-based narrow-band channel 502 are independently controlled. Accordingly, by adjusting uplink/downlink mode conversion time points C1 and C2 of the wide-band TDD channel 501 and the narrow-band TDD channel 502, a continuous downlink of a narrow band may be implemented using the wide-band TDD downlink 501$d$ and the narrow-band TDD downlink, or a continuous downlink of a narrow band may be implemented using the wide-band TDD uplink 501$u$ and the narrow-band TDD uplink. Using these characteristics, a continuous FDD mode can be implemented through a combination of an FDD downlink including the wide-band TDD downlink 501$d$ and the narrow-band TDD downlink 502$d$ and the narrow-band FDD uplink 503$u$.

It is also possible to implement a wide/narrow HDT mode obtained by combining the wide-band TDD downlink and the narrow-band FDD uplink 503$u$, or to implement a narrow-band HDT mode obtained by combining the narrow-band TDD downlink 502$d$ and the narrow-band FDD uplink 503$u$.

The characteristics of seven duplexing modes, as described above, can be arranged as shown in Table of Appendix A attached hereto. In the EHDT system according to the present invention, an inner area and an outer area on the basis of a concentric circle exist around the base station within the entire area of the cell.

As shown in Table 1, because diverse duplexing characteristics can be obtained depending on which channels are selected and how the selected channels are combined, a proper duplexing mode can be selected and applied according to a required quality of service supported by the system.

As described above, the optimum system performance can be secured by selecting seven duplexing modes according to the system environment/channel environment/service quality.

Figure 6:
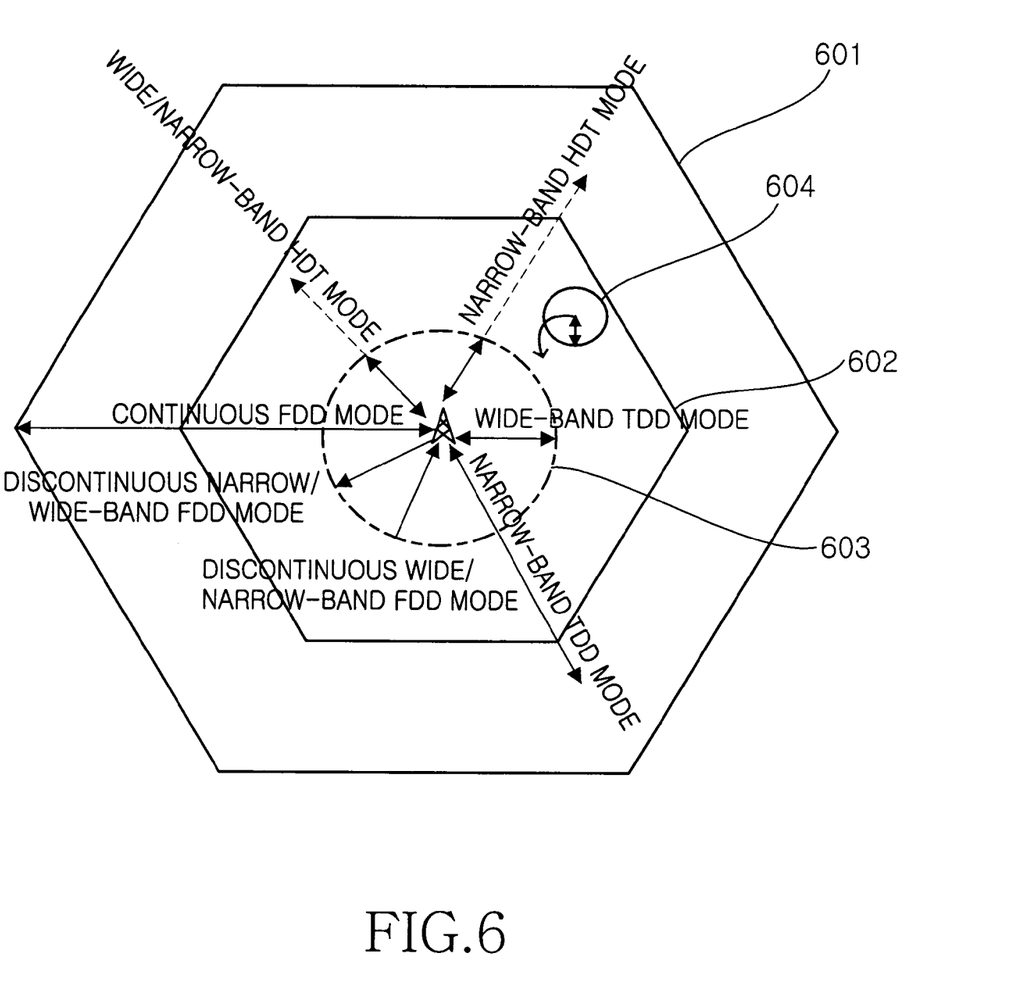
FIG. 6 illustrates a system to which EHDT-based duplexing modes are applied according to a preferred embodiment of the present invention.

FIG. 6 is an exemplary view illustrating the system to which seven duplexing modes are applied according to a preferred embodiment of the present invention. Referring to FIG. 6, the cell is classified into a macro-cell 601, a micro-cell 602, and a pico-cell 603 according to the size of the cell radius around a base station 600. Additionally, a hot-spot cell 604 may be provided within the whole cell area.

In the case of designing the entire cell in consideration of the size of the cell and mobility, it is preferable that the wide-band TDD mode, discontinuous wide/narrow-band FDD mode, or discontinuous narrow/wide-band FDD mode is applied to the pico-cell. It is also possible to apply the wide/narrow-band HDT mode to the pico-cell according to various circumstances. It is efficient to apply the narrow-band TDD mode, wide/narrow-band HDT mode or narrow-band HDT mode to the micro-cell. In the case of the macro-cell, it is most efficient to apply the continuous FDD mode thereto, and according to circumstances, it may be considered that both the narrow-band TDD mode and the narrow-band HDT mode are applied to the macro-cell.

Because the continuous FDD mode and the narrow-band HDT mode secure the link continuity, they may be the most suitable duplexing modes in a state that the link continuity such as handover is required. Accordingly, even in the system to which other duplexing modes are applied, it is preferable to perform the duplex mode conversion to the continuous FDD mode or the narrow-band HDT mode when the handoff is required.

In determining the duplexing mode based on the cell radius, it is advantageous to apply the TDD when the cell radius is relatively small, such as the micro-cell 602 or the pico-cell 603, and FDD is advantageous when the cell radius is large, such as the macro-cell 601.

In an embodiment of the present invention, the cell radius, mobility support, service kind, etc., are considered when the duplexing mode is selected. The priority of duplex mode selection according to the respective points to be considered will now be explained.

First, when selecting the duplexing mode based on the cell radius, TDD is advantageous because the micro cell 602 or the pico-cell 603 having a relatively small cell radius is designed for a high-speed data service in a terminal that is fixed or has a low mobility. In the system intended for a low-speed data service in a high-speed mobile terminal such as the macro cell 601, FDD is advantageous.

Accordingly, based on the cell radius and the traffic characteristic suitable to the cell radius, the priority of the duplexing mode advantageous to the micro-cell 602 or the pico-cell 603 is in the order of a wide-band TDD mode, wide/narrow-band HDT mode, discontinuous wide/narrow-band FDD mode, and discontinuous narrow/wide-band FDD mode. The priority of the duplexing mode advantageous to the macro-cell 601 is in the order of a continuous FDD mode, narrow-band HDT mode, and narrow-band TDD mode.

In consideration of the performance of mobility support, TDD can support the mobility for fixed or low-speed terminals, and HDT can support the mobility for fixed, low-speed and intermediate-speed terminals. In the case of FDD, the mobility for fixed, low-speed, intermediate-speed, and high-speed terminals is supported.

For a high-speed data service, the priority of the duplex mode selection that can be considered when the duplex mode is selected according to the kind of service is in the order of a wide-band TDD mode, wide/narrow-band HDT mode, discontinuous wide/narrow-band FDD mode, and discontinuous narrow/wide-band FDD mode. For a low-speed data service, the priority of the duplexing mode selection is in the order of a narrow-band TDD mode, narrow-band HDT mode and continuous FDD mode. In consideration of the asymmetric data service support, the priority of the duplex mode selection is in the order of a wide-band TDD mode, narrow-band TDD mode, wide/narrow-band HDT mode and narrow-band HDT mode.

In the system according to a preferred embodiment of the present invention, because the uplink/downlink mode conversion time points C1 and C2 of two TDD channels can be independently adjusted, it is possible to simultaneously perform the wide-band TDD mode and the narrow-band TDD mode. In this case, a high-speed data transmission service is provided by applying the wide-band TDD mode in the micro-cell 602, and a low-speed data transmission service is provided by applying the narrow-band TDD mode in the macro-cell 601. By arranging the wide-band TDD mode and the narrow-band TDD mode according to the cell radius in the multi cell environment, TDD interference among the multi cells can be avoided.

As described above, based on the link continuity, the duplex mode suitable to the handover is the continuous FDD mode and the narrow-band HDT mode. Further, even in the system to which other duplexing modes are applied, it is preferable to perform a duplexing mode conversion to the continuous FDD mode or the narrow-band HDT mode when the handoff is requested. Particularly, it is preferable that when the handover is requested, the user of the TDD mode of the inner area, i.e., the micro-cell or pico-cell, converts to the continuous FDD mode, and the user of the FDD mode of the inner area converts to the narrow-band HDT mode.

In consideration of the duplexing mode conversion in the respective cases, it is preferable that the user of the wide-band TDD mode converts to the narrow-band HDT or continuous FDD mode, the user of the wide/narrow-band HDT mode converts to the narrow-band HDT mode, the user of the narrow TDD user converts to the narrow-band HDT mode, the user of the discontinuous wide/narrow-band FDD mode converts to the continuous FDD mode, and the user of the discontinuous narrow/wide-band FDD mode converts to the continuous FDD mode, respectively.

In order to provide a seamless service, a mode conversion between the duplexing techniques using the same band is required. Accordingly, if the uplink and downlink use the same band and if the required amounts of uplink and downlink traffic are changed, the mode conversion from the discontinuous wide/narrow-band FDD mode around the downlink to the discontinuous wide/narrow-band FDD mode around the uplink is performed, so that seamless service can be provided.

If the wide-band channel is commonly used and the service area is extended, the mode conversion from the wide-band TDD mode to the continuous FDD mode can be used. If the wide-band channel is commonly used and a large amount of feedback information is required or the increase of mobility is required, the seamless service can be provided by performing a mode conversion from the wide-band TDD mode to the discontinuous wide/narrow-band FDD mode.

It is also possible to differentiate user terminals having different bands. More specifically, because it is easy to provide even the narrow-band service with respect to the wide-band terminal by hardware and to provide low-speed data-oriented services with respect to the narrow-band terminal, it is possible to provide all types of services with respect to the wide-band terminal.

As described above, according to the EHDT-based communication method according to the present invention, a flexible resource management is possible according to the communication environment by dividing the entire system band into two or more subbands, differentiating the bandwidths of the subbands and the duplexing techniques, and selecting and allocating the resources of the subbands according to the position of the terminal within the cell.

Additionally, based on the EHDT-based communication method according to the present invention, because the optimum duplexing technique to match the communication environment can be selected and applied by allocating the uplink and downlink resources by TDD, FDD, and HDT according to the position of the terminal within the cell, an efficient resource management is possible.

Additionally, based on the EHDT-based communication method according to the present invention, because the subbands having different bandwidths can selectively be used for the uplink and downlink resource allocation, all terminals that support the wide-band and narrow-band communications can be supported.

While the present invention has been shown and described with reference to certain preferred embodiments thereof, it will be understood by those skilled in the art that various changes in form and details may be made therein without departing from the spirit and scope of the present invention as defined by the appended claims.

APPENDIX

|  | TDD | TDD | FDD | FDD | FDD | HDT | HDT |
|---|---|---|---|---|---|---|---|
|  |  |  | Discontinuous | Discontinuous |  |  |  |
|  | Wide-Band TDD | Narrow-Band TDD | Wide/Narrow-Band FDD | Narrow/Wide-Band FDD | Continuous FDD | Wide/Narrow-Band HDT | Narrow-Band HDT |
| Downlink | Inner Area High-Speed Data | Whole Area Low-Speed Data | Inner Area High-Speed Data | Whole Area Low-Speed Data | Whole/Inner Area High/Low-Speed Data | Inner Area High-Speed Data | Whole Area Low-Speed Data |
| Uplink | Inner Area High-Speed Data | Whole Area Low-Speed Data | Whole Area Low-Speed Data | Inner Area High-Speed Data | Whole Area High-Speed Data | Inner Area: High Outer Area: Low | Whole Area Low-Speed Data |
| Mobility Support Area | High Speed Inner Area High-Speed Data Transmission | Low Speed Whole Area Low-Speed Data | Middle/High Speed Inner Area (Downlink High-Speed Data) Outer Area (Downlink Support Limited) | Middle/High Speed Inner Area (Uplink High-Speed Data) Outer Area (Uplink Support Limited) | Middle/High Speed Narrow-Band Downlink/ Narrow-Band Uplink (Considering Continuity of Downlink) | Fixed/Low/ Middle Speed Discriminative Service Providing For Each Area | Low/Middle/ High Speed |
| Feedback Channel | AMC, MIMO Applied/ Suitable to Hot-Spot | Suitable to Cell Edge | Feedback Information Application | Discontinuous Feedback Information Application | Feedback Information Application | Feedback Information Applicable | Feedback Information Applicable |
| Asymmetric Characteristic | Support of Asymmetric Characteristic of High-Speed Data | Support of Asymmetric Characteristic of Low-Speed Data | ↔ Switching Possible According to Service Request | | | Support of Asymmetric Characteristic of High-Speed Data | Support of Asymmetric Characteristic of Low-Speed Data |
| Handoff Support | No Support | Supportable |  |  | Suitable to Support | Supportable | Suitable to Support |

What is claimed is:

1. A communication method in a cellular communication system including at least one base station for communicating with a plurality of terminals through a system frequency band, the method comprising the steps of:
   dividing a cell of the base station into at least two logical areas;
   dividing the system frequency band into first and second Time Division Duplexing (TDD) subbands and one Frequency Division Duplexing (FDD) subband; and
   communicating in different duplexing modes using at least one of the subbands according to a position of the terminal within the cell.

2. The communication method as claimed in claim 1, wherein a TDD subband is divided into a TDD downlink resource and a TDD uplink resource, and the FDD subband is an FDD uplink resource.

3. The communication method as claimed in claim 1, wherein the cell is divided into a first logical area, a second logical area, and a third logical area, each having a different concentric circle diameter.

4. The communication method as claimed in claim 3, wherein an uplink resource and a downlink resource of the first TDD subband are allocated to a terminal located in the first logical area.

5. The communication method as claimed in claim 3, wherein an uplink resource of the first TDD subband and a downlink resource of the second TDD subband are allocated to a terminal located in the first logical area.

6. The communication method as claimed in claim 3, wherein a downlink resource of the first TDD subband and a FDD uplink resource are allocated to a terminal located in the first logical area.

7. The communication method as claimed in claim 3, wherein an uplink resource and a downlink resource of the second TDD subband are allocated to a terminal located in the second logical area.

8. The communication method as claimed in claim 3, wherein a downlink resource of the first TDD subband and a FDD uplink resource are allocated to a terminal located in the second logical area.

9. The communication method as claimed in claim 3, wherein a downlink resource of the second TDD subband and a FDD uplink resource are allocated to a terminal located in the second logical area.

10. The communication method as claimed in claim 3, wherein downlink resources of the first TDD subband and the second TDD subband are allocated in series and a FDD uplink resource is allocated to a terminal located in the third logical area.

11. The communication method as claimed in claim 3, wherein an uplink resource and a downlink resource of the second TDD subband are allocated to a terminal located in the third logical area.

12. The communication method as claimed in claim 3, wherein a downlink resource of the second TDD subband and a FDD uplink resource are allocated to a terminal located in the third logical area.

13. The communication method as claimed in claim 3, wherein one of a combination of an uplink resource and a downlink resource of the first TDD subband, a combination of the uplink resource of the first TDD subband and a downlink resource of the second TDD subband, a combination of the downlink resource of the first TDD subband and an uplink resource of the second TDD subband, and a combination of the downlink resource of the first TDD subband and a FDD uplink resource is allocated to a terminal located in the first logical area.

14. The communication method as claimed in claim 13, wherein the combination allocated to the terminal located in the first logical area is converted into the downlink resource of the second TDD subband and the FDD uplink resource when a handoff is requested.

15. The communication method as claimed in claim 3, wherein one of a combination of an uplink resource and a downlink resource of the second TDD subband, a combination of a downlink resource of the first TDD subband and a FDD uplink resource, and a combination of the downlink resource of the second TDD subband and the FDD uplink resource is allocated to a terminal located in the second logical area.

16. The communication method as claimed in claim 15, wherein if one of the combination of the uplink resource and the downlink resource of the second TDD subband and the combination of the downlink resource of the first TDD subband and the FDD uplink resource is allocated to the terminal located in the second logical area, the allocated combination is converted into the combination of the downlink resources of the first TDD subband and the second TDD subband and the FDD uplink resource when a handoff is requested.

17. The communication method as claimed in claim 15, wherein if one of the combination of the uplink resource and the downlink resource of the second TDD subband and the combination of the downlink resource of the first TDD subband and the FDD uplink resource is allocated to the terminal located in the second logical area, the allocated combination is converted into the combination of the downlink resources of the second TDD subband and the FDD uplink resource when a handoff is requested.

18. The communication method as claimed in claim 3, wherein one of a combination of uplink resources of the first TDD subband and the second TDD subband and a FDD uplink resource, a combination of the uplink resource and a downlink resource of the second TDD subband, and a combination of the downlink resource of the second TDD subband and the FDD uplink resource is allocated to a terminal located in the third logical area.

19. The communication method as claimed in claim 18, wherein if the combination of the uplink resource and the downlink resource of the second TDD subband is allocated to the terminal located in the third logical area, the allocated combination is converted into the combination of the downlink resources of the first TDD subband and the second TDD subband and the FDD uplink resource when a handoff is requested.

20. The communication method as claimed in claim 18, wherein if the combination of the uplink resource and the downlink resource of the second TDD subband is allocated to the terminal located in the third logical area, the allocated combination is converted into the combination of the downlink resource of the second TDD subband and the FDD uplink resource when a handoff is requested.

21. The communication method as claimed in claim 1, wherein the first TDD subband has a bandwidth wider than a bandwidth of the second TDD subband.

22. The communication method as claimed in claim 1, wherein time points of uplink/downlink mode conversion of the first TDD subband and the second TDD subband are independently adjusted.

* * * * *